United States Patent [19]

Yamada et al.

[11] Patent Number: 4,979,277

[45] Date of Patent: Dec. 25, 1990

[54] METHOD OF FABRICATING A BIASING PLATE SPRING FOR A WIRE-DOT PRINT HEAD

[75] Inventors: Tetsuhiro Yamada; Masahiro Tatsukami, both of Tokyo, Japan

[73] Assignee: Oki Electric Industry Co., Ltd., Tokyo, Japan

[21] Appl. No.: 428,302

[22] Filed: Oct. 26, 1989

[30] Foreign Application Priority Data

Oct. 28, 1988 [JP] Japan ................................ 63-270812

[51] Int. Cl.$^5$ ................................................ B23P 13/00

[52] U.S. Cl. ......................................... 29/173; 29/418; 51/313; 209/940

[58] Field of Search .......................... 29/174, 418, 423; 51/313, 314, 315, 316; 209/940

[56] References Cited

U.S. PATENT DOCUMENTS 4,674,179 6/1987 Gugel et al. .......................... 29/418

*Primary Examiner*—P. W. Echols

*Attorney, Agent, or Firm*—Spencer & Frank

[57] ABSTRACT

In a method of fabricating a biasing plate spring for a wire dot print head having an annular part and a plurality of projections extending radially inward from the inner periphery of the annular part, a biasing plate spring intermediate product having two of the projections substantially opposite to each other and connected by an arm, is first formed. The intermediate product is then barrel-polished, and then the arm is removed by cutting. Because of the arm, entry of one intermediate product into the gap between adjacent projections of another intermediate product is prevented, and damage to the intermediate product is thereby avoided.

7 Claims, 4 Drawing Sheets

METHOD OF FABRICATING A BIASING PLATE SPRING FOR A WIRE-DOT PRINT HEAD

BACKGROUND OF THE INVENTION

The present invention relates to a method of fabricating a print head in a serial printer, and more particularly to a method of fabricating a biasing plate spring used in a wire dot print head.

In known wire-dot print heads, armatures having print wires on their tips are attracted to cores by means of a magnetic flux from a permanent magnet. An opposing magnetic flux is generated by coils to cancel the magnetic flux from the permanent magnet, and printing is made by the drive of the wires.

Wire-dot print heads of this type use a biasing plate spring to give biasing forces when the armatures are released, have a good frequency response, and are called a spring charged wire-dot print head.

FIG. 1 is a cross sectional view of a spring-charged wire-dot print head.

It comprises print wires 1 for impacting printing medium through inked ribbon. The print wires 1 are bonded and fixed to tips of armatures Z. The armatures 2 are fixed to a biasing plate spring 8 and are supported in such a manner that they can swing with the biasing plate spring 3.

The biasing plate spring B is formed of a generally circular thin plate and has projections 4 toward the center. The armatures 2 are fixed to the projections 4.

The print head further comprises a first yoke 5. a second yoke 6, a first magnetic spacer 7, and a second magnetic spacer 8. The biasing plate spring 3 is held between the first magnetic spacer 7 and the second magnetic spacer 8. The print head further comprises a third yoke 9, a permanent magnet 10, and a core frame 11. The permanent magnet 10 generates a magnetic flux for attracting the armatures 2 to the core frame 11.

Demagnetizing coils 12 are wound on the core frame 11. When energized each coil 12 generates a magnetic flux opposing the magnetic flux of the permanent magnet 10, to release the armature 2 that has been attracted to the core frame 12.

An impact force adjustment screw 13 is provided to adjust the biasing force of the biasing plate spring 3. A middle guide 14 and a tip guide 15 are provided to guide the print wires. A head frame 10 is also provided.

When the coil 12 is not energized, the magnetic flux from the permanent magnet 10 passes through the third yoke 8, the first magnetic spacer 7, the second yoke 6, the first yoke 5, the armature 2, and the core frame 11, thereby forming a magnetic circuit. Owing to the magnetic attraction generated by the magnetic circuit, the armature 2 is attracted to the core frame 11, deforming the biasing plate spring 8.

When the coil 12 is energized, the magnetic flux generated by the coil 12 cancels the magnetic flux from the permanent magnet 10, to release the biasing plate spring 3 driving the print wire 1 fixed to the tip of the armature 2.

The biasing plate spring 3 used in the above wire-dot print head is formed by first producing an intermediate product 21 shown in FIG. 2 and FIG. 3. FIG. 2 is a plan view of the biasing plate spring intermediate product formed in the prior-art method of biasing plate spring fabrication, and FIG. 3 is a cross sectional view along line A-B in FIG. 2.

That is, metal spring material is first etched into an intermediate product 21 having an annular part 21*a* and a plurality of projections 4 extending inward from the inner periphery of the annular part 21*a*. Gaps 22 are formed between the projections 4.

The intermediate product 21 is then barrel-polished for removing flashes.

However, in the above-described prior-art method of fabrication of the biasing plate spring 3, the barrel-polishing process for removing flashes is conducted by placing several hundreds of biasing plate spring intermediate products 21 in a barrel machine, so, during the barrel-polishing process, one intermediate product may enter the gap 22 of another intermediate product 21.

As a result, the intermediate products damage each other, yielding defective products. When the defective products are used, with their defects undetected, they may break during use of the wire-dot print head.

SUMMARY OF THE INVENTION

An object of the present invention is to eliminate the above problems in the prior-art method of fabrication of a biasing plate spring and to provide a method of fabrication of a biasing plate spring by which the entry of on intermediate product into the gap of another intermediate product is prevented, and damage to the intermediate products is prevented.

In the present invention, in a method of fabrication of a biasing plate spring for a wire-dot print head, a biasing plate spring intermediate product having a pair of projections opposite to each other and connected by an arm is first formed, and the intermediate product is then barrel-polished to remove flashes on the intermediate product. The arm is then cut off to form the biasing plate spring.

According to the invention, a biasing plate spring intermediate product in which a pair of the projections are integrally connected by an ar is first formed. Accordingly, while the barrel polishing is being made, entrg of one intermediate product into the gap of another intermediate product is prevented. As a result, each intermediate product is barrel-polished while being kept separated from other intermediate products.

DETAILED DESCRIPTION OF THE PREFERRED EMBODIMENTS

An embodiment of the invention will now be described with reference to FIG. 4 and FIG. 5.

Figure 1:
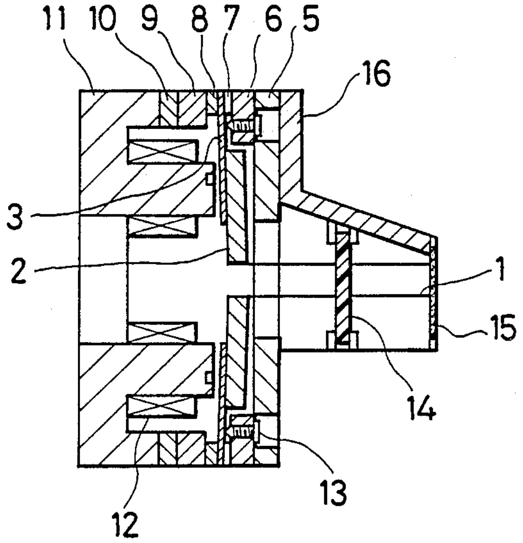
FIG. 1 PRIOR ART
FIG. 1 is a cross sectional view of a prior-art spring-charged wire-dot print head.
Figure 2:
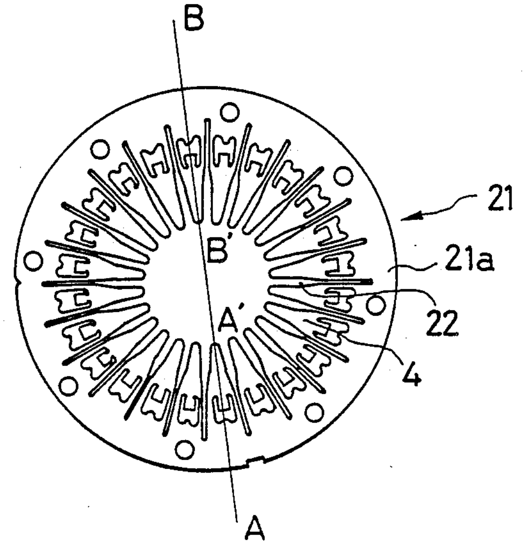
FIG.2 PRIOR ART
FIG. 2 is a plan view showing a biasing plate spring intermediate product formed by the prior-art method of fabrication of the biasing plate spring.
Figure 3:
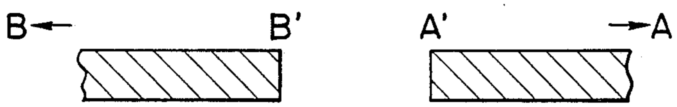
FIG.3 PRIOR ART
FIG. 3 is a cross sectional view along line A-B in FIG. 3.
Figure 4:
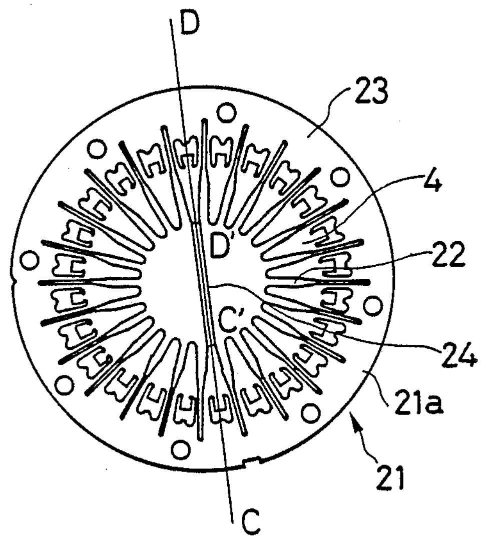
FIG. 4 is a plan view showing a biasing plate spring intermediate product formed in the method of fabrication of the biasing plate spring for a wire-dot print head according to the invention.
Figure 5:
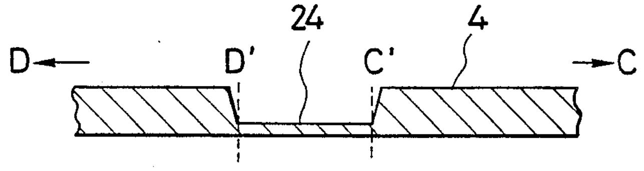
FIG. 5 is a cross sectional view along line C-D in FIG. 4.
Figure 6:
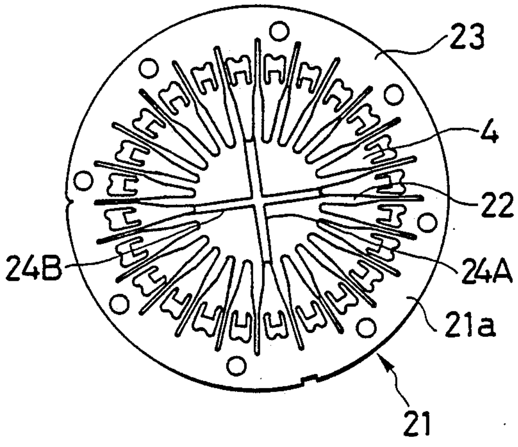
FIG. 6 is a plan view showing a biasing plate spring intermediate product formed in the method of fabrication of another embodiment of the invention.

FIG. 4 is a plan view of a biasing plate spring intermediate product formed in the method of fabrication of the biasing plate spring for a wire-dot print head, and FIG. 5 is a cross sectional view along line C-D in FIG. 4.

In the figures, the biasing plate spring intermediate product 23 is formed from a resilient metal material, by means of etching. e.g., eletrolytic etching, into an intermediate product 21 having an annular part 21*a* and plurality of projections 4 extending radially inward from the inner periphery of the annular part 21*a*. The projections 4 correspond in number to the print wires. That is, where there are nine print wires, nine projections are provided. Where there are eighteen print wires, eighteen projections are provided. Where there are 24 print wires. 24 projections are provided.

An arm 24 is formed integrally with the biasing plate spring intermediate product 23 to connect inner tips of a pair of the projections 4 substantially diametrically opposite to each other. When there are an odd number of print wires. e.g., nine print wires, there are no pair of projections which are exactly opposite to each other. In this case, a projection and another projection substantially opposite to the first-mentioned projection and next to the diametric line passing the first-mentioned projection are selected. Preferably, the arm 24 is half-etched so that it is thinner than the projections 4.

The biasing plate spring intermediate product 23 thus formed is subjected to barrel-polishing. In this barrel-polishing, several hundreds of intermediate products 23 are together placed in a barrel machine and are subjected to barrel-polishing to remove flashes. Entry into the gap 22 of one intermediate product 23, of another intermediate product 23 can be prevented by the arm 24.

After the barrel-polishing, the arm 24 is removed by cutting, e.g., by punching. Subsequently, lapping is conducted to form a completed biasing plate spring 3. Any flash formed during the punching to remove the arm 24 can be eliminated by this lapping.

Figure 7:
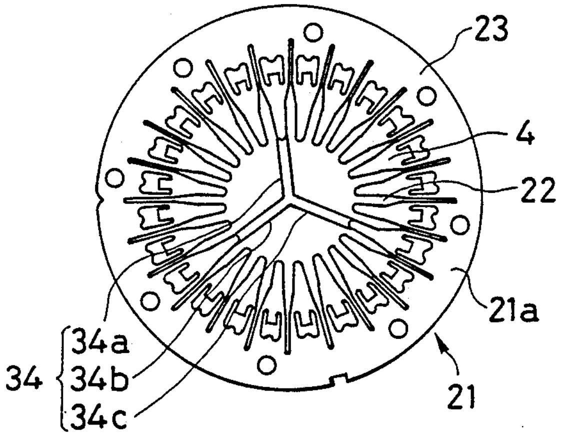
FIG. 7 is a plan view showing a biasing plate spring intermediate product formed in the method of fabrication of a further embodiment of the invention.

The present invention is not limited to the embodiment described above, and various modifications are possible without departing from the scope of the invention. For example, there can be two or more arms that connect the opposite projections and intersect each other. An example of this modification shown in FIG. B comprises two arms 24A and 24B spaced about 80° apart from each other. Also, an arm 34 shown in FIG. 7 may be used in place. This arm 34 comprises three radially extending parts 34*a*, 34*b* and 34*c* spaced about 120° apart from each other and having one ends connected to the projections and having the other ends connected together.

As has been described, according to the invention, a biasing plate spring intermediate product having a pair of projections opposing each other connected integrally by an arm, is first formed. During barrel-polishing, entry into the gap of one biasing plate spring intermediate product of another is prevented by the arm. Accordingly, the barrel-polishing is made with the intermediate product being completely separated. As a result, the intermediate products do not damage each other, and production of defective products is prevented, and the yield is improved, and the reliability of the biasing plate spring is improved.

What is claimed is:

1. A method of fabricating a biasing plate spring for a wire-dot print head having an annular part and a plurality of projections extending radially inward from the inner periphery of the annular part, said method comprising the steps of:

(a) forming a biasing plate spring intermediate product having an annular part and a plurality of projections extending radially inward from the inner periphery of the annular part with two of the projections being connected by an arm;

(b) barrel-polishing said biasing intermediate product; and (c) removing said arm by cutting.

2. The method according to claim 1, wherein said step (a) of forming the biasing plate spring intermediate product comprises forming the intermediate product having a pair of projections substantially opposite to each other being connected by the arm.

3. The method according to claim 1, wherein said step (a) of forming the biasing plate spring intermediate product comprises forming the intermediate product having tips of a pair of projections being connected by the arm.

4. The method according to claim 1, wherein said step (a) of forming the biasing plate spring intermediate product comprises etching.

5. The method according to claim 1 wherein said step (c) of of barrel-polishing comprises barrel-polishing a plurality of the biasing plate spring intermediate products together.

6. The method according to claim 1, wherein said step (c) removing said arm comprises punching.

7. The method according to claim 1, further comprising the step (d) of lapping the biasing plate spring after said step (c).

* * * * *